(12) United States Patent
Takahashi

(10) Patent No.: US 10,361,438 B2
(45) Date of Patent: Jul. 23, 2019

(54) ALKALINE DRY CELL

(71) Applicant: Panasonic Intellectual Property Management Co., Ltd., Osaka-shi, Osaka (JP)

(72) Inventor: Yasufumi Takahashi, Hyogo (JP)

(73) Assignee: PANASONIC INTELLECTUAL PROPERTY MANAGEMENT CO., L, Osaka (JP)

( * ) Notice: Subject to any disclaimer, the term of this patent is extended or adjusted under 35 U.S.C. 154(b) by 9 days.

(21) Appl. No.: 15/740,042

(22) PCT Filed: Sep. 28, 2016

(86) PCT No.: PCT/JP2016/004364
§ 371 (c)(1),
(2) Date: Dec. 27, 2017

(87) PCT Pub. No.: WO2017/056491
PCT Pub. Date: Apr. 6, 2017

(65) Prior Publication Data
US 2018/0190997 A1 Jul. 5, 2018

(30) Foreign Application Priority Data
Sep. 30, 2015 (JP) .................. 2015-192540

(51) Int. Cl.
*H01M 6/06* (2006.01)
*H01M 4/06* (2006.01)
(Continued)

(52) U.S. Cl.
CPC ............... *H01M 6/06* (2013.01); *H01M 4/06* (2013.01); *H01M 4/12* (2013.01); *H01M 4/388* (2013.01);
(Continued)

(58) Field of Classification Search
CPC .......... H01M 6/06; H01M 4/628; H01M 4/12; H01M 4/388; H01M 4/06; H01M 4/42; H01M 4/62
See application file for complete search history.

(56) References Cited

U.S. PATENT DOCUMENTS 3,281,278 A 10/1966 Schaefer
4,377,625 A * 3/1983 Parsen .................... H01M 4/06
429/347

(Continued)

FOREIGN PATENT DOCUMENTS

JP 61-208753 A 9/1986
JP 2-194103 A 7/1990
(Continued)

OTHER PUBLICATIONS

International Search Report dated Dec. 27, 2016, issued in counterpart International Application No. PCT/JP2016/004364 (2 pages).

*Primary Examiner* — Stewart A Fraser
(74) *Attorney, Agent, or Firm* — Westerman, Hattori, Daniels & Adrian, LLP

(57) ABSTRACT

An alkaline dry cell includes a positive electrode, a negative electrode, and an alkaline electrolyte solution. The negative electrode includes a terephthalic acid compound and a negative electrode active material containing zinc. The terephthalic acid compound is terephthalic acid having an electron-withdrawing substituent or a salt thereof. The electron-withdrawing substituent is, for example, at least one selected from the group consisting of Br, F, and Cl. The terephthalic acid compound preferably includes terephthalic acid having one electron-withdrawing substituent or a salt thereof.

6 Claims, 1 Drawing Sheet

(51) Int. Cl.
  *H01M 4/42* (2006.01)
  *H01M 4/62* (2006.01)
  *H01M 4/38* (2006.01)
  *H01M 4/12* (2006.01)
  *H01M 4/02* (2006.01)
  *H01M 6/08* (2006.01)

(52) U.S. Cl.
  CPC .............. *H01M 4/42* (2013.01); *H01M 4/62* (2013.01); *H01M 4/628* (2013.01); *H01M 6/085* (2013.01); *H01M 2004/027* (2013.01); *H01M 2004/028* (2013.01)

(56) References Cited

U.S. PATENT DOCUMENTS

| | | |
|---|---|---|
| 5,240,793 A | 8/1993 | Glaeser |
| 2009/0023077 A1 | 1/2009 | Kato et al. |
| 2013/0189571 A1* | 7/2013 | Abouimrane ........... H01M 4/60 429/188 |

FOREIGN PATENT DOCUMENTS

| | | |
|---|---|---|
| JP | 2-226657 A | 9/1990 |
| WO | 2008/018455 A1 | 2/2008 |

* cited by examiner

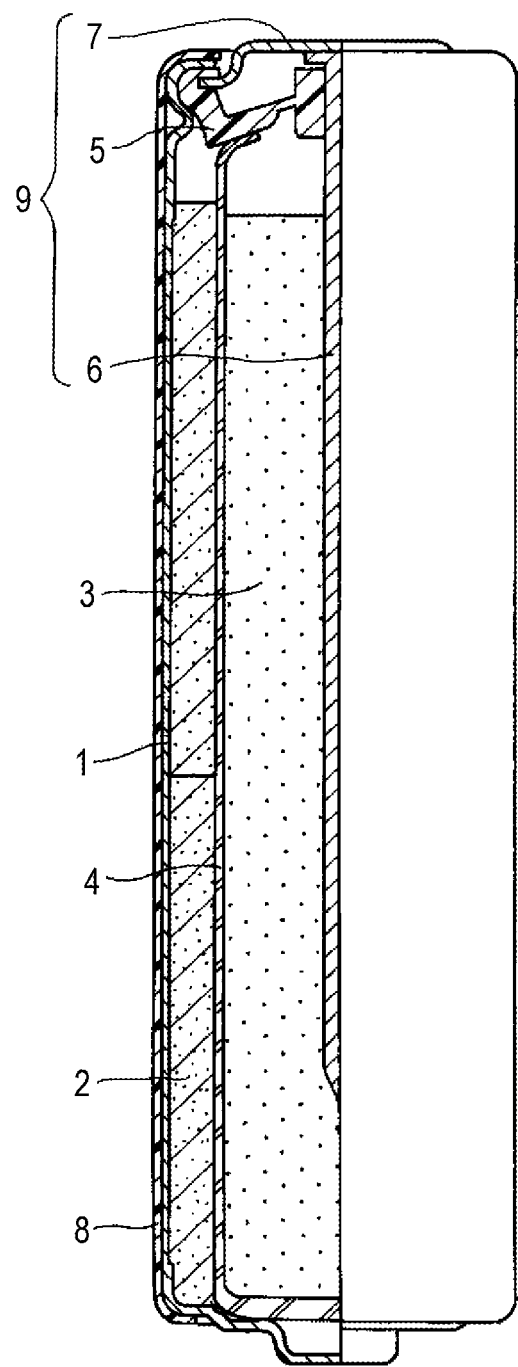

ALKALINE DRY CELL

TECHNICAL FIELD

The present invention relates to an improvement of a negative electrode for an alkaline dry cell.

BACKGROUND ART

Alkaline dry cells (alkaline manganese dry cells) are widely used because the capacity is large and a large current can be drawn. Alkaline dry cells normally include a gelled negative electrode containing a zinc powder or a zinc alloy powder as a negative electrode active material. To suppress corrosion of negative electrode active materials due to alkaline electrolyte solutions, Patent Literature 1 and Patent Literature 2 disclose that aryl carboxylic acids, such as terephthalic acid and salicylic acid, are used as anti-corrosive agents for negative electrode active materials of alkaline dry cells.

In applications pertaining to, for example, portable audio devices, electronic games, lighting devices, and toys, there is a need for alkaline dry cells having good discharge characteristics in a middle current region (e.g., 50 mA to 500 mA) (middle-rate discharge characteristics). Even if alkaline dry cells have good high-rate discharge characteristics or good low-rate discharge characteristics, good middle-rate discharge characteristics are not always obtained.

CITATION LIST

Patent Literature

PTL 1: Japanese Published Unexamined Patent Application No. 61-208753

PTL 2: Japanese Published Unexamined Patent Application No. 2-194103

SUMMARY OF INVENTION

In a typical alkaline dry cell, zinc ions are released from zinc or a zinc alloy, which is a negative electrode active material, during charging, and part of zinc ions form complexes. At the last stage of charging, zinc oxide is further famed, and zinc oxide deposits on the surfaces of negative electrode active material particles. These reactions are more easily accelerated during middle-rate discharging than during low-rate discharging. In particular, zinc oxide thickly accumulates on the surfaces of negative electrode active material particles as a result of accelerated formation and deposition of zinc oxide at the last stage of charging. This accumulation of zinc oxide blocks discharge reaction sites of negative electrode active material particles, leading to a failure to deintercalate unreacted zinc in the negative electrode active material particles. That is, the negative electrode active material particles are passivated with a large amount of unreacted zinc left, so that charging stops early. If blockage of discharge reaction sites on the surfaces of negative electrode active material particles and associated passivation of the negative electrode active material particles is avoided, the life of alkaline dry cells during middle-rate discharging can be extended.

The use of terephthalic acid or salicylic acid as a negative electrode, as in Patent Literature 1 or Patent Literature 2, is anticipated to avoid corrosion of zinc due to alkaline electrolyte solutions to some degree. However, the use of these substances barely exerts an effect of improving the life of cells during middle-rate discharging.

The present disclosure is directed to extending the life of alkaline dry cells during middle-rate discharging.

According to an aspect of the present disclosure, an alkaline dry cell includes a positive electrode, a negative electrode, and an alkaline electrolyte solution.

The negative electrode includes a terephthalic acid compound and a negative electrode active material containing zinc.

The terephthalic acid compound is terephthalic acid having an electron-withdrawing substituent or a salt thereof.

According to the present disclosure, the life of alkaline dry cells during discharging at a middle rate can be improved.

BRIEF DESCRIPTION OF DRAWINGS

FIG. 1 is a partially sectional front view of an alkaline dry cell in an embodiment of the present invention.

DESCRIPTION OF EMBODIMENTS

An alkaline dry cell according to an embodiment of the present invention includes a positive electrode, a negative electrode, and an alkaline electrolyte solution. The negative electrode includes a terephthalic acid compound and a negative electrode active material containing zinc. The terephthalic acid compound is terephthalic acid having an electron-withdrawing substituent or a salt thereof.

In the related art, an attempt to add an anti-corrosive agent to a negative electrode in alkaline dry cells has been made in order to prevent a negative electrode active material from being dissolved in an alkaline electrolyte solution. Terephthalic acid and salicylic acid may function as such an anti-corrosive agent and may prevent decomposition of the electrolyte solution on the surface of a negative electrode active material.

During middle-rate discharging of alkaline dry cells, zinc oxide thickly accumulates on the surfaces of negative electrode active material particles as the discharge proceeds. The formation of zinc oxide blocks the reaction sites and passivates the negative electrode active material particles. As a result, the negative electrode active material cannot be used for the discharge reaction, so that the cell life is shortened. If passivation of the negative electrode active material due to zinc oxide is suppressed, the cell life during middle-rate discharging may be improved. Even when an anti-corrosive agent, such as terephthalic acid or salicylic acid, is added to a negative electrode, however, it is difficult to improve the cell life during middle-rate discharging. Even if the cell life during high-rate discharging or low-rate discharging is long, the cell life during middle-rate discharging is not always extended.

In an embodiment, the cell life during middle-rate discharging can be improved by using a particular terephthalic acid compound, such as terephthalic acid having an electron-withdrawing substituent or a salt thereof, as a negative electrode. Although the reason for this is unclear, the terephthalic acid compound may interact with zinc in some way to block the reaction sites and suppress deposition of zinc oxide. As a result, the discharge stop due to passivation of the negative electrode active material may be delayed.

A negative electrode in an alkaline dry cell is a gelled negative electrode containing a negative electrode active material. Since terephthalic acid is barely dissolved in a negative electrode gel, terephthalic acid may rarely interact with zinc and may be thus less effective to suppress deposition of zinc oxide. In response to this, the above-mentioned terephthalic acid compound is easily dissolved in the gel because of its electron-withdrawing substituent and tends to interact with zinc. The solubility of the terephthalic acid compound in the gel thus may have some influence on the effect of suppressing deposition of zinc oxide. Although phthalic acid or isophthalic acid is dissolved in the negative electrode gel, it is, however, difficult to obtain the effect of improving the cell life during middle-rate discharging. This fact indicates that only the solubility in the gel does not have an influence on the effect of suppressing deposition of zinc oxide and, in addition to solubility, there are other factors that have some influence on the interaction with zinc.

The terephthalic acid compound seems to exert its effect when dissolved in a gel electrolyte and electrically dissociated into ions. Therefore, the gel electrolyte preferably contains an ion of the terephthalic acid compound, or a halide ion and a terephthalate ion formed by releasing a halogen or the like.

An example method for causing the gel electrolyte to contain both terephthalic acid and a halide ion may include a method of adding both halide potassium and terephthalic acid. This method, however, is undesirable because it is difficult to form terephthalate ions from terephthalic acid because of low solubility of terephthalic acid.

Alkaline dry cells according to embodiments will be described below in detail with reference to the drawing. The present invention is not limited to the following embodiments. Various changes and modifications can be made as long as the advantageous effects of the present invention are imparted. Moreover, one embodiment can be combined with other embodiments.

FIG. 1 is a front view of an alkaline dry cell in an embodiment of the present invention. The front view includes vertically half of the cross-section. As illustrated in FIG. 1, the alkaline dry cell includes a positive electrode 2 having a hollow cylindrical shape, a negative electrode 3 located in the hollow of the positive electrode 2, a separator 4 interposed therebetween, and an alkaline electrolyte solution (not shown). These components are placed in a cell case 1 having a bottomed cylindrical shape and serving also as a positive electrode terminal. The positive electrode 2 is located in contact with the inner wall of the cell case 1. The hollow of the positive electrode 2 is filled with the gelled negative electrode 3 while the separator 4 is interposed between the positive electrode 2 and the negative electrode 3. The separator 4 has a bottomed cylindrical shape and is located on the inner surface of the hollow of the positive electrode 2. The separator 4 separates the positive electrode 2 and the negative electrode 3 and separates the negative electrode 3 and the cell case 1. The positive electrode 2 contains manganese dioxide and an alkaline electrolyte solution. The negative electrode 3 contains a zinc-containing negative electrode active material and a terephthalic acid compound and normally further contains an alkaline electrolyte solution and a gelling agent.

The opening of the cell case 1 is sealed with a sealing unit 9. The sealing unit 9 includes a gasket 5, a negative electrode terminal plate 7 serving also as a negative electrode terminal, and a negative electrode current collector 6. The negative electrode current collector 6 is inserted into the negative electrode 3. The negative electrode current collector 6 has a nail-like shape with a head and a body. The body is inserted into a through-hole provided in a central cylindrical portion of the gasket 5. The head of the negative electrode current collector 6 is welded to a flat part at a center portion of the negative electrode terminal plate 7. The opening end of the cell case 1 is crimped to the flange at the periphery of the negative electrode terminal plate 7 with the peripheral end of the gasket 5 interposed therebetween. The outer surface of the cell case 1 is covered with an outer label 8.

The alkaline dry cell will be described below in detail.
(Negative Electrode)

Examples of the negative electrode active material include zinc and a zinc alloy. The zinc alloy may contain at least one selected from the group consisting of indium, bismuth, and aluminum from the viewpoint of corrosion resistance. The amount of indium in the zinc alloy is, for example, 0.01% to 0.1% by mass. The amount of bismuth is, for example, 0.003% to 0.02% by mass. The amount of aluminum in the zinc alloy is, for example, 0.001% to 0.03% by mass. The proportion of elements other than zinc in the zinc alloy is preferably 0.025% to 0.08% by mass from the viewpoint of corrosion resistance.

The negative electrode active material is normally used in a powder foam. From the viewpoints of the filling property of the negative electrode and the diffusion of the alkaline electrolyte solution in the negative electrode, the average particle size (D50) of the negative electrode active material powder is, for example, 100 to 200 μm, and more preferably 110 to 160 μm.

The terephthalic acid compound is terephthalic acid having an electron-withdrawing substituent or a salt thereof. The terephthalic acid compound may be used alone or in combination of two or more.

The electron-withdrawing substituent is any substituent having an inductive effect (I-effect), and examples thereof include a nitro group, a cyano group, a tosyl group, a mesyl group, halogen atoms, alkyl halide groups, and acyl groups. Examples of halogen atoms and halogen atoms in alkyl halide groups include Br, F, Cl, and I. The terephthalic acid compound may contain one or more or two or more of these electron-withdrawing substituents.

From the viewpoints of the solubility in the gel and the life during middle-rate discharging, the electron-withdrawing substituent is preferably a halogen atom, such as Br, F, or Cl, and more preferably Br.

The terephthalic acid compound may have an electron-donating substituent, such as an alkyl group or a hydroxy group, as long as the terephthalic acid compound has an electron-withdrawing substituent.

Examples of salts of terephthalic acid include salts of terephthalic acid with inorganic bases, and salts of terephthalic acid with organic bases. Examples of salts with inorganic bases include alkali metal salts, alkaline earth metal salts, and ammonium salts. Examples of alkali metal salts include a sodium salt and a potassium salt. Examples of alkaline earth metal salts include a magnesium salt and a calcium salt. Examples of salts with organic bases include an amine salt.

In the terephthalic acid compound, the number of electron-withdrawing substituents is 1 to 4 and preferably 1 or 2. To further extend the cell life during middle-rate discharging, in particular, the terephthalic acid compound preferably has only one electron-withdrawing substituent. In particular, the use of 2-bromoterephthalic acid or a salt thereof improves the effect of extending the life during middle-rate discharging.

The advantageous effects of the present invention can be obtained according to the amount of the terephthalic acid compound added. The amount of the terephthalic acid compound is appropriately set according to the desired degree of the effect. Even when the terephthalic acid compound is added in a small amount, the life during middle-rate discharging is longer than that obtained when an equivalent amount of terephthalic acid or salicylic acid is used. The amount of the terephthalic acid compound is, for example, 1000 ppm to 15000 ppm, more preferably 1000 ppm to 10000 ppm, and still more preferably 3000 ppm to 10000 ppm, relative to the mass of the negative electrode active material. The terephthalic acid compound may also move to the positive electrode or the separator through the alkaline electrolyte solution. The above-described amount is the total amount of the terephthalic acid compound in the cell.

The negative electrode is produced by, for example, mixing zinc-containing negative electrode active material particles, a terephthalic acid compound, a gelling agent, and an alkaline electrolyte solution.

The gelling agent is any known gelling agent used in the field of alkaline dry cells. For example, a thickener or a water-absorbing polymer can be used. Examples of such a gelling agent include polyacrylic acid and sodium polyacrylate.

The amount of the gelling agent added is, for example, 0.5 to 2 parts by mass per 100 parts by mass of the negative electrode active material.

For viscosity adjustment or the like, a surfactant, such as a polyoxyalkylene group-containing compound or a phosphate, may be used in the negative electrode. Among surfactants, for example, a phosphate or an alkali metal salt thereof is preferred. To uniformly disperse the surfactant in the negative electrode, the surfactant is preferably added in advance to the alkaline electrolyte solution used to produce the negative electrode.

To improve corrosion resistance, a compound containing a metal having a high hydrogen overvoltage, such as indium or bismuth, may appropriately be added to the negative electrode. To suppress the growth of dendrites of zinc or the like, a small amount of a silicic acid compound, such as silicic acid or a potassium salt thereof, may appropriately be added to the negative electrode.

(Negative Electrode Current Collector)

Examples of the materials of the negative electrode current collector inserted into the gelled negative electrode include metals and alloys. The negative electrode current collector preferably contains copper and may be made of, for example, an alloy containing copper and zinc, such as brass. The negative electrode current collector may be given a plating treatment, such as tin plating, as desired.

(Positive Electrode)

The positive electrode normally contains a conductive agent and an alkaline electrolyte solution in addition to manganese dioxide, which is a positive electrode active material. The positive electrode may further contain a binder as desired.

Manganese dioxide is preferably electrolytic manganese dioxide. Examples of crystal forms of manganese dioxide include α type, β type, γ type, δ type, ε type, η type, λ type, and ramsdellite type forms.

Manganese dioxide is used in a powder form. The average particle size (D50) of manganese dioxide is, for example, 25 to 60 μm because, for example, the filling property of the positive electrode and the diffusion of the electrolyte solution in the positive electrode are ensured easily.

To obtain formability and suppress expansion of the positive electrode, the BET specific surface area of manganese dioxide may be, for example, in the range from 35 to 50 m²/g. The BET specific surface area is a surface area measured and calculated by using the BET equation, which is a theoretical equation for multilayer adsorption. The BET specific surface area can be measured by using, for example, the specific surface area measuring apparatus based on the nitrogen adsorption method.

Examples of the conductive agent include carbon black, such as acetylene black, and conductive carbon materials, such as graphite. Graphite may be, for example, natural graphite or artificial graphite. The conductive agent may be in, for example, a fiber form but preferably in a powder form. The average particle size (D50) of the conductive agent is, for example, 3 to 20 μm.

As used herein, the term "average particle size (D50)" refers to a median size in the volume-based particle size distribution. The average particle size is determined by using, for example, a laser diffraction-scattering particle distribution analyzer.

The amount of the conductive agent in the positive electrode is, for example, 3 to 10 parts by mass, and preferably 5 to 9 parts by mass per 100 parts by mass of manganese dioxide.

The positive electrode is produced by, for example, pressure-forming a positive electrode mixture into a pellet. The positive electrode mixture contains a positive electrode active material, a conductive agent, an alkaline electrolyte solution, and as desired, a binder. The positive electrode mixture may be formed into flakes or granules and, as desired, sized before pressure-forming into a pellet.

After the pellet is placed in the cell case, the pellet is secondarily pressurized using a predetermined device so as to be in close contact with the inner wall of the cell case.

(Separator)

Examples of the material of the separator include cellulose and polyvinyl alcohol. The separator may be a nonwoven fabric mainly containing a fiber made of the above-described material or may be a microporous membrane, such as cellophane.

FIG. 1 illustrates the separator having a bottomed cylindrical shape. The separator is not limited to this and may be a separator having a known shape used in the field of alkaline dry cells. For example, a cylindrical separator and a bottom paper (or a bottom separator) may be used together.

The thickness of the separator is, for example, 200 to 300 μm. The separator preferably has the above-described thickness as a whole. When the separator is composed of thin sheets, a plurality of layered sheets has the above-described thickness as a whole.

(Alkaline Electrolyte Solution)

The alkaline electrolyte solution is contained in the positive electrode, the negative electrode, and the separator. The alkaline electrolyte solution is, for example, an alkaline aqueous solution containing potassium hydroxide. The concentration of potassium hydroxide in the alkaline electrolyte solution is preferably 30% to 50% by mass. The alkaline aqueous solution may further contain zinc oxide. The concentration of zinc oxide in the alkaline electrolyte solution is, for example, 1% to 5% by mass.

(Cell Case)

The cell case is, for example, a metal case having a bottomed cylindrical shape. The metal case is formed of, for example, a nickel-plated steel sheet. To improve the adhesion between the positive electrode and the cell case, the cell case is preferably a metal case whose inner surface is covered with a carbon coating film.

EXAMPLES

Although the present invention will be described below in detail based on Examples and Comparative Examples, the present invention is not limited to the following Examples.

Examples 1 to 4

In accordance with the procedure of (1) to (3) described below, a AA alkaline dry cell (LR6) illustrated in FIG. 1 was produced.

(1) Production of Positive Electrode

To an electrolytic manganese dioxide powder (average particle size (D50): 35 μm), which was a positive electrode active material, a graphite powder (average particle size (D50): 8 μm), which was a conductive agent, was added to produce a mixture. The mass ratio of the electrolytic manganese dioxide powder to the graphite powder was 92.4:7.6. The specific surface area of the electrolytic manganese dioxide powder was 41 $m^2/g$. An electrolyte solution was added to the mixture, and the mixture was stirred well and then compressed into flakes to produce a positive electrode mixture. The mass ratio of the mixture to the electrolyte solution was 100:1.5. The electrolyte solution was an alkaline aqueous solution containing potassium hydroxide (concentration: 35% by mass) and zinc oxide (concentration: 2% by mass).

The flake-like positive electrode mixture was pulverized to form granules, and these granules were sized through screens. Eleven grams of granules that had passed through 10 to 100 mesh screens were pressure-famed into a hollow cylindrical shape with an outer diameter of 13.65 mm, producing two positive electrode pallets.

(2) Production of Negative Electrode

The gelled negative electrode 3 was produced by mixing a zinc alloy powder (average particle size (D50): 130 μm), which was a negative electrode active material, 2-bromoterephthalic acid, the electrolyte solution, and a gelling agent. The zinc alloy was a zinc alloy containing 0.02% by mass of indium, 0.01% by mass of bismuth, and 0.005% by mass of aluminum. The gelling agent was a mixture of cross-linked branched polyacrylic acid and highly cross-linked linear sodium polyacrylate. The mass ratio of the negative electrode active material, the electrolyte solution, and the gelling agent was 100:50:1. 2-Bromoterephthalic acid was used in the amounts shown in Table 1 relative to the mass of the negative electrode active material.

(3) Assembly of Alkaline Cell

The inner surface of a cell case (outer diameter: 13.80 mm, wall thickness of cylindrical part: 0.15 mm, height: 50.3 mm) having a bottomed cylindrical shape and famed of a nickel-plated steel sheet was coated with Varniphite available from Nippon Graphite Industries, Co., Ltd. to form a carbon coating film about 10 μm thick, producing the cell case 1. Two positive electrode pallets were inserted vertically into the cell case 1 and then pressed to form the positive electrode 2 that adheres to the inner wall of the cell case 1. The separator 4 (thickness: 0.27 mm) having a bottomed cylindrical shape was placed on the inner side of the positive electrode 2. The electrolyte solution was then injected so that the separator 4 was impregnated with the electrolyte solution. These components were left to stand in this state for a predetermined time until the electrolyte solution permeates the positive electrode 2 from the separator 4. Subsequently, 6 g of the gelled negative electrode 3 was placed on the inner side of the separator 4.

The separator 4 was produced by winding three times a nonwoven fabric sheet (basis weight: 28 $g/m^2$, thickness: 0.09 mm) mainly containing a solvent-spun cellulose fiber and a polyvinyl alcohol fiber at a mass ratio of 1:1.

The negative electrode current collector 6 was produced by pressing general brass (Cu content: about 65 mass %, Zn content: about 35 mass %) into a nail shape and then plating the surface with tin. The diameter of the body of the negative electrode current collector 6 was 1.15 mm. The head of the negative electrode current collector 6 was electrically welded to the negative electrode terminal plate 7 formed of a nickel-plated steel sheet. The body of the negative electrode current collector 6 was then press-fitted into the through-hole at the center of a gasket 5 mainly composed of polyamide 6 and polyamide 12. This process produced a sealing unit 9 including the gasket 5, the negative electrode terminal plate 7, and the negative electrode current collector 6.

Next, the sealing unit 9 was placed at the opening of the cell case 1. At this time, the body of the negative electrode current collector 6 was inserted into the negative electrode 3. The opening end of the cell case 1 is crimped to the periphery of the negative electrode terminal plate 7 with the gasket 5 interposed therebetween, sealing the opening of the cell case 1. The outer surface of the cell case 1 was covered with the outer label 8. Alkaline dry cells (A1 to A4) were produced accordingly.

(4) Evaluation

The produced alkaline dry cells were evaluated as described below.

(Cell Life during Middle-Rate Discharging)

Each alkaline dry cell was discharged at a temperature of 20±1° C. until the cell voltage reached 0.9 V at a resistance of 3.9Ω. The discharge time (min) here was evaluated as a cell life.

Comparative Example 1

An alkaline dry cell B1 was produced and evaluated in the same manners as those in Example 1 except that 2-bromoterephthalic acid was not used in production of a negative electrode.

Examples 5 to 7 and Comparative Example 2

Alkaline dry cells A5 to A7 and B2 were produced and evaluated in the same manners as those in Example 3 except that the compounds shown in Table 1 were used instead of 2-bromoterephthalic acid in production of negative electrodes.

Comparative Examples 3 to 5

Alkaline dry cells B3 to B5 were produced and evaluated in the same manners as those in Example 2 except that the compounds shown in Table 1 were used instead of 2-bromoterephthalic acid in production of negative electrodes.

The evaluation results are shown in Table 1 together with the type and amount of the compounds used in production of the negative electrodes. Examples 1 to 7 correspond to the alkaline dry cells A1 to A7. Comparative Examples 1 to 5 correspond to the alkaline dry cells B1 to B5. The compounds include terephthalic acid compounds and other aryl carboxylic acids. The amount of such a compound refers to the amount relative to the amount of the negative electrode active material.

TABLE 1

| | Compound | | Discharge time |
| --- | --- | --- | --- |
| | type | amounts (ppm) | (min) during middle-rate discharging |
| A1 | 2-bromoterephthalic acid | 1000 | 358 |
| A2 | 2-bromoterephthalic acid | 3000 | 402 |
| A3 | 2-bromoterephthalic acid | 5000 | 438 |
| A4 | 2-bromoterephthalic acid | 10000 | 462 |
| A5 | 2-floroterephthalic acid | 5000 | 393 |
| A6 | 2,5-dibromoterephthalic acid | 5000 | 384 |
| A7 | 2,5-dichroloterephthalic acid | 5000 | 397 |
| B1 | — | 0 | 354 |
| B2 | terephthalic acid | 5000 | 357 |
| B3 | 2-hydroxyterephthalic acid | 3000 | 346 |
| B4 | 2,5-dihydroxyterephthalic acid | 3000 | 341 |
| B5 | salicylic acid | 3000 | 335 |

As shown in Table 1, the life during middle-rate discharging is longer in Examples than that of the cell B1 of Comparative Example 1 free of the compound. Comparing the cell A3 of Example 3 and the cell B2 of Comparative Example 2, the life during middle-rate discharging for the cell A3 containing 2-bromoterephthalic acid is much longer than that for the cell B2 containing an equivalent amount of terephthalic acid. Similar differences in the effect were found in the comparison between the cell A2 of Example 2 and the cells B3 to B5 of Comparative Examples 3 to 5.

INDUSTRIAL APPLICABILITY

The cell according to an embodiment of the present invention can be used for any device powered by dry cells. In particular, the cell has a long life during middle-rate discharging and is thus suitable for devices associated with middle-rate discharging, such as portable audio devices, electronic games, lighting devices, and toys.

REFERENCE SIGNS LIST

1 Cell Case
2 Positive Electrode
3 Negative Electrode
4 Separator
5 Gasket
6 Negative Electrode Current Collector
7 Negative Electrode Terminal Plate
8 Outer Label
9 Sealing Unit

The invention claimed is:

1. An alkaline dry cell comprising: a positive electrode, a negative electrode, and an alkaline electrolyte solution, wherein
the negative electrode includes a terephthalic acid compound and a negative electrode active material containing zinc, and
the terephthalic acid compound is terephthalic acid having an electron-withdrawing substituent or a salt thereof.

2. The alkaline dry cell according to claim 1, wherein the electron-withdrawing substituent is at least one selected from the group consisting of Br, F, and Cl.

3. The alkaline dry cell according to claim 1, wherein the terephthalic acid compound includes terephthalic acid having one electron-withdrawing substituent or a salt thereof.

4. The alkaline dry cell according to claim 1, wherein the terephthalic acid compound includes 2-bromoterephthalic acid or a salt thereof.

5. The alkaline dry cell according to claim 1, wherein an amount of the terephthalic acid compound is 1000 ppm to 10000 ppm relative to a mass of the negative electrode active material.

6. The alkaline dry cell according to claim 1, wherein the negative electrode contains a halide ion and a terephthalate ion.

* * * * *